United States Patent
Zhao et al.

(10) Patent No.: US 8,953,538 B2
(45) Date of Patent: Feb. 10, 2015

(54) NETWORK ACCESS METHOD AND SYSTEM FOR MACHINE TYPE COMMUNICATIONS

(75) Inventors: Qun Zhao, Shanghai (CN); Wu Zheng, Shanghai (CN); Jimin Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 77 days.

(21) Appl. No.: 13/578,172

(22) PCT Filed: Feb. 12, 2010

(86) PCT No.: PCT/CN2010/000207
§ 371 (c)(1),
(2), (4) Date: Aug. 9, 2012

(87) PCT Pub. No.: WO2011/097767
PCT Pub. Date: Aug. 18, 2011

(65) Prior Publication Data
US 2012/0307774 A1  Dec. 6, 2012

(51) Int. Cl.
H04W 4/00 (2009.01)
H04W 74/08 (2009.01)
H04W 28/04 (2009.01)
H04W 74/00 (2009.01)

(52) U.S. Cl.
CPC ............ *H04W 74/08* (2013.01); *H04W 28/042* (2013.01); *H04W 74/004* (2013.01); *H04W 74/006* (2013.01); *H04W 4/005* (2013.01)
USPC ............................ 370/329; 370/338; 370/230

(58) Field of Classification Search
CPC ............ H04W 74/08; H04W 74/0866; H04W 74/004; H04W 74/008; H04W 74/085
USPC ......... 370/328, 329, 235, 242, 330, 336, 338, 370/331, 230; 375/259, 260; 455/509, 437, 455/500
See application file for complete search history.

(56) References Cited

U.S. PATENT DOCUMENTS

| | | | |
|---|---|---|---|
| 2008/0043771 A1* | 2/2008 | Cho et al. | 370/431 |
| 2008/0194243 A1 | 8/2008 | Jeong et al. | |
| 2010/0002582 A1* | 1/2010 | Luft et al. | 370/230.1 |
| 2010/0323736 A1* | 12/2010 | Fischer et al. | 455/509 |
| 2012/0004003 A1* | 1/2012 | Shaheen et al. | 455/509 |
| 2012/0257576 A1* | 10/2012 | Jeong et al. | 370/328 |

FOREIGN PATENT DOCUMENTS

CN 101595662 A 12/2009
WO WO2008097030 A1 8/2008

OTHER PUBLICATIONS

International Search Report for PCT/CN2010/000207, dated Nov. 18, 2010.

* cited by examiner

*Primary Examiner* — Bob Phunkulh
*Assistant Examiner* — Wali Butt
(74) *Attorney, Agent, or Firm* — Fay Sharpe LLP

(57) ABSTRACT

The present invention provides a network access method and system for Machine Type Communications (MTC), wherein the method comprises the following steps: an MTC device sends a preamble to a base station; the base station sends a Random Access Response (RAR) to the MTC device; if the RAR does not contain a temporary access resource assignment indication, the MTC device sends a Layer 2/Layer 3 message to the base station; otherwise, the MTC device re-attempts to perform network access; the base station sends a contention resolution message to the MTC device; if the contention resolution message contains a self-identification contained in the Layer 2/Layer 3 message sent by the MTC device, the network access is completed; if the contention resolution message contains the temporary access resource assignment indication, the MTC device re-attempts to perform the network access; otherwise, the MTC device attempts to perform the network access using the originally used access resource again. According to the present invention, it is enabled to dynamically and quickly perform assignment and release of MTC access resources based on actual access resource collisions, which thereby avoids waste of uplink resources in a semi-static configuration, reduces the possibility of collision, and protects normal access of non-MTC devices.

14 Claims, 3 Drawing Sheets

NETWORK ACCESS METHOD AND SYSTEM FOR MACHINE TYPE COMMUNICATIONS

FIELD OF THE INVENTION

Embodiments of the present invention relate to communication technology, and specifically relate to a network access method and system for Machine Type Communications MTC.

BACKGROUND OF THE INVENTION

Machine-to-Machine communication is a form of data communication which involves one or more entities that do not necessarily need human interaction. Machine Type Communication (MTC) services have introduced a plurality of new features which are different from for example the services provided by current mobile network communications. For example, the MTC service has a burst characteristic and might involve a potentially large number of communicating terminals, resulting in a dramatic increase of communication connections within a short time. In the MTC service, the potentially large number of communicating terminals may attempt almost simultaneously to attach to an access network or activate a connection. For example, consider a typical application—bridge monitoring with a mass of sensors. Hundreds or even thousands of sensors may simultaneously initiate network access when a vehicle passes through the bridge. Or, consider another typical application—metering. Thousands of meters in buildings may start to report their measurements or reading results at almost the same predetermined time, say 12:00 pm (generally, a precise reporting time will not be scheduled for each meter). Apparently, such a burst of access attempts is highly possible to collide with each other in the access channels of the access network, and even collide with normal access attempts of other non-MTC devices served by the access network. This causes congestion in the access channels (e.g. random access channels) of the access network which is originally designed for the access attempts of human-to-human communications, and thus dampening, for example, normal communications between conventional user equipments, which have stricter requirements on guaranteed transmission quality. The typical common RACH (PRACH) load in 3GPP LTE is about 128 attempts per second at 10 MHz. However, the PRACH load caused by a mass of MTC devices may be far beyond this.

In addition, the present study on Machine-to-Machine communications further points out a possibility to perform MTC through a mobile network. However, in order to provide the mobile network with competitiveness in Machine Type Applications, there is a need for optimization so as to support the features of MTC.

In 3GPP LTE, a variety of available RACH time-frequency resource configurations are specified for different system bandwidths and different numbers of cells of each base station (or enhanced base station eNB). It should be understood that more RACH time-frequency resources can be configured in advance to accommodate a potential burst of MTC device access, i.e., configuring RACH video resources of a system based on the number of MTC access attempts during a burst. However, the semi-static resource configuration may waste much of uplink resources due to the burst characteristic of the MTC device access. In addition, even if the base station is configured to provide more access time-frequency resources, considering the considerable number of MTC devices and simultaneity of their access operations, the uplink resources to accommodate the burst of MTC device access may not be sufficient, especially for a system with a high system bandwidth or in a case of multiple cells under each base station. Because for such system and such case, the number of access time-frequency resources for non-MTC device access has been considerable, it would be difficult to reserve sufficient time-frequency resources for the MTC devices without affecting the access of non-MTC devices.

Therefore, there is a need for a network access method for MTC, such that even when a considerable number of MTC devices attempt to perform access simultaneously, it can still guarantee that the access of non-MTC devices is not affected. Meanwhile, the method can support such features of the MTC services as burst, a considerable number of access requests, etc., so as to dynamically assign the required access time-frequency resources according to requirements, resolve congestion in the RACH channels, and avoid waste of the uplink resources.

SUMMARY OF THE INVENTION

In view of the above problems, the present invention provides a network access method for Machine Type Communication (MTC), comprising the following steps:

a. sending a preamble by an MTC device in a cell to a base station of the cell so as to attempt to perform network access;

b. sending an access response by the base station to the MTC device after receiving the preamble;

c. after receiving the access response, if the access response does not contain a temporary access resource assignment indication, sending a Layer 2/Layer 3 message by the MTC device to the base station; and if the access response contains the temporary access resource assignment indication, returning to step a and sending the preamble by the MTC device using the assigned temporary access resource based on the indication so as to re-attempt to perform the network access;

d. sending a contention resolution message by the base station to the MTC device after receiving the Layer 2/Layer 3 message;

e. after receiving the contention resolution message, if the contention resolution message contains a self-identification contained in the Layer 2/Layer 3 message sent by the MTC device at step c, completing the network access by the MTC device; if the contention resolution message contains the temporary access resource assignment indication, returning to step a and sending the preamble by the MTC device using the assigned temporary access resource based on the indication, so as to re-attempt to perform the network access; otherwise, returning to step a and sending the preamble by the MTC device using the originally used access resource again, so as to re-attempt to perform the network access.

In this way, it is enabled to assign temporary access resources quickly to MTC devices based on severity of the actual collision, thereby avoiding congestion in the access channels.

Preferably, the following steps are further comprised between step a and step b/between step d and step e:

f. performing collision detection by the base station based on the preamble/Layer 2/Layer 3 message;

g. if a collision is detected in step f, determining severity of the collision by the base station;

h. if it is determined in step g that the severity of the collision exceeds a first collision threshold, assigning a temporary access resource and including the temporary access resource assignment indication in the sent access response/contention resolution message by the base station.

Preferably, the method further comprises the step: i. after the temporary access resource is assigned, if the severity of the collision drops below a second collision threshold, stopping the assignment of the temporary access resource by the base station. In step i, the base station further releases the assigned temporary access resource or a part thereof after the MTC device completes the network access using the temporary access resource.

In this way, it is enabled to dynamically release the assigned resources and avoid waste of the uplink resources.

Preferably, when the MTC device performs an access attempt using a non-temporary access resource, in step a, the preamble sent by the MTC device is selected from a subset of preambles, the subset of preambles comprising a part of all available preambles of the cell. The MTC device may know the subset of preambles by listening to system broadcast information sent by the base station.

In this way, probability of collisions between MTC devices and non-MTC devices will be further reduced, and the normal access of the non-MTC devices will be protected.

The present invention further provides a network access system for Machine Type communications (MTC), comprising:

one or more MTC devices in a cell;

a base station of the cell;

wherein the MTC device is adapted to:

send a preamble to the base station so as to attempt to perform network access;

after receiving an access response from the base station, if the access response does not contain a temporary access resource assignment indication, send a Layer 2/Layer 3 message to the base station; if the access response contains the temporary access resource assignment indication, send the preamble using the assigned temporary access resource based on the indication so as to re-attempt to perform the network access;

after receiving a contention resolution message from the base station, if the contention resolution message contains a self-identification contained in the Layer 2/Layer 3 message sent by the MTC device, complete the network access; if the contention resolution message contains the temporary access resource assignment indication, the MTC device sends the preamble using the assigned temporary access resource based on the indication so as to re-attempt to perform the network access; otherwise, the MTC device sends the preamble using the originally used access resource again so as to attempt to perform the network access.

The present invention has the following advantages: first, it considers the burst characteristic of the MTC device access, dynamically assigns (and releases) the temporary access resources, and saves a considerable number of uplink resources; second, it protects the network access of the non-MTC devices very well and prevents it from influence of the burst of MTC device access; third, it quickly assigns new access resources and solves congestion in original access channels, while the prior art cannot assign more resources on the basis of the highest configuration.

BRIEF DESCRIPTION OF THE DRAWINGS

The above and other objectives, features and advantages of the present invention will become more apparent through the following description of preferred embodiments of the present invention with reference to the accompanying drawings, wherein.

DETAILED DESCRIPTION OF EMBODIMENTS

Figure 1:
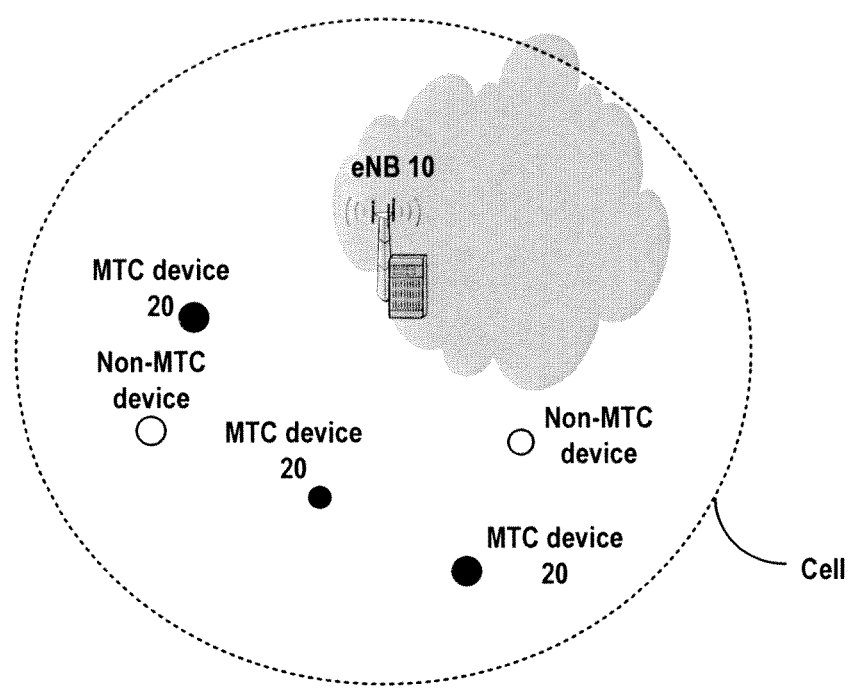
FIG. 1 illustrates an example of an application environment of the present invention, wherein MTC devices, non-MTC devices, and a base station in a cell are schematically illustrated.

The present invention adopts a dynamic temporary access resource assignment scheme with respect to the features of an MTC network, such as burst and a considerable amount of access, such that when the severity of a collision caused by the network access of MTC devices in a cell is severe, for example, resulting in congestion in the access channel (e.g., RACH) of a non-MTC device and affects its normal access operation, temporary access resources which can be used for the MTC devices are assigned, and when the severity of the collision drops below an acceptable level, all or a part of the temporary access resources are released. Besides, in an embodiment of the present invention, a subset of preambles used by the MTC devices is also provided, wherein the subset is composed of a part of all available preambles of the cell. The MTC devices can only select the preamble from the subset to send network access attempts. In this way, the collisions between the network access of MTC devices and the network access of non-MTC devices will be further reduced.

In the present invention, non-MTC devices may include any other devices than MTC devices, for example, a conventional user equipment (UE), a terminal device operated by a user to perform access and communication. A non-MTC type of communication or access may be any communication or access except for the MTC type of communication or access, for example, it may be the communication between user equipments as terminals or the communication between a terminal and a base station. In the following description, a 3GPP LTE wireless communication application environment is taken as an example. It should be noted that the embodiments of the present invention are not limited to these applications, but adapted to more other relevant communication application environments, for example, an application environment comprising MTC devices.

The inventors of the present application note that current network service functions, particularly mobile network services, are mainly designed for non-MTC services, without considering the features of MTC services such as burst, a considerable amount of access, and the like. Thus, on the basis of the current network services, if an MTC service is directly added, it is very likely to cause channel congestion and affect normal communication for example between conventional user equipments. In order to accommodate such Machine Type Application, optimization is required to support the features of MTC.

In the embodiments of the present invention, slight modifications are made to the access response and contention resolution message in the existing standards so as to accommodate access actions of MTC devices. According to an embodiment of the present invention, after an MTC device receives an access response from a base station, if the access response does not contain a temporary access resource assignment indication, the MTC device sends a Layer 2/Layer 3 message to the base station; if the access response contains the temporary access resource assignment indication, the MTC device resends the preamble using the assigned temporary access resource based on the indication, so as to re-attempt to perform network access. In addition, after the MTC device receives a contention resolution message from the base station, if the contention resolution message contains a self-identification contained in the Layer 2/Layer 3 message sent by the MTC device, the network access is completed; if the contention resolution message contains the temporary access resource assignment indication, the MTC device resends the preamble using the assigned temporary access resource based on that indication, so as to re-attempt to perform the network access; otherwise, the preamble is resent by using the originally used access resource again to re-attempt to perform the network access. For the base station, in addition to performing collision detection with respect to the access resources, it further determines the severity of a collision and determines whether to assign the temporary access resource thereby. If it is determined to make the assignment, the temporary access resource assignment indication is included in the sent access response/contention resolution message so that the MTC device can perform the network access using the assigned temporary access resource based on the indication. Hereinafter, an exemplary network access procedure is described with reference to FIG. 1 and FIG. 2.

Figure 2:
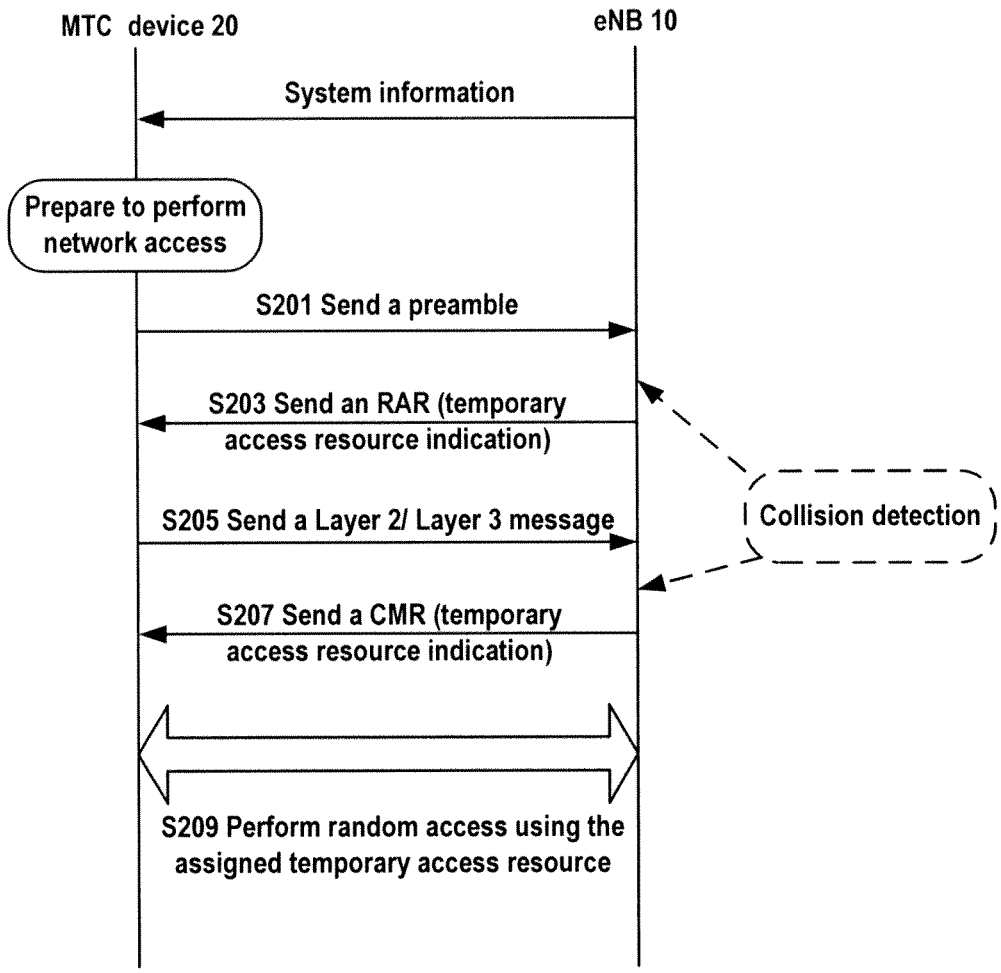
FIG. 2 schematically illustrates a network access procedure for MTC in the present invention.

FIG. 1 illustrates an example of the application environment of the present invention, wherein MTC devices, non-MTC devices and a base station (which is an enhanced base station eNB in the 3GPP LTE wireless communication application environment) in a cell are schematically illustrated. FIG. 1 merely illustrates one cell under the coverage of eNB, which is only for the sake of clarity, and the present invention is also applicable to a circumstance where each base station has a plurality of cells. The cell may have one or more non-MTC devices and one or more MTC devices. Hereinafter, the network access procedure of MTC devices is mainly described, while the network access procedure of non-MTC devices may adopt the procedure or approach well known to those skilled in the art. Besides, during the description, unnecessary details and functions for the present invention and those details and functions well known to those skilled in the art are omitted so as to prevent from obscuring understanding of the present invention. FIG. 2 schematically illustrates a network access procedure for MTC according to an embodiment of the present invention, wherein a random access approach is taken as an example. Those skilled in the art would appreciate that the present invention is not limited to the particular random access approach, but is applicable to a plurality of network access approaches. Hereafter, the preferred embodiments of the present invention will be described with reference to FIGS. 1 and 2.

In FIG. 1, when one or more MTC devices 20 prepare to perform network access through a random access procedure, the MTC device 20 receives system information of the cell so as to obtain synchronization with the cell. At step 201, the MTC device 20 sends a preamble so as to initiate a random access attempt. At step 203, eNB 10 sends a Random Access Response (RAR) to the MTC device 20 after receiving the preamble. At step 205, the MTC device 20 sends a Layer 2/Layer 3 message to the eNB 10 after receiving the Random Access Response. At step 207, the eNB 10 sends a contention resolution message to the MTC device 20 after receiving the Layer 2/Layer 3 message. Before the eNB 10 sends the RAR, and before the eNB 10 sends the CRM, the eNB 10 would perform collision detection. If no collision is detected, the random access procedure of the MTC device 20 is substantially the same as the random access procedure steps for a non-MTC device in the existing standards (for example, 3GPP LTE), wherein the RAR, the Layer 2/Layer 3 message and CRM may also adopt corresponding messages in the existing standards. The access of the MTC device 20 is successful after step 207, and then the access procedure ends.

If the eNB 10 detects a collision before step 203, specifically, detecting that the MTC device 20 and one or more other MTCs or non-MTC devices send a same preamble simultaneously at the same time-frequency resource, the above procedure would be somewhat different. In an existing method for non-MTC devices, if the eNB 10 detects a collision before step 203, the RAR will not be sent, so that the non-MTC devices may know occurrence of the collision and wait for a certain period of time, for example, a time window, before attempting random access. According to an embodiment of the present invention, when the eNB 10 detects a collision based on the preamble at this point, the eNB 10 further detects severity of the collision, for example, determining whether the severity of the collision exceeds a collision threshold. Here, the severity of a collision and the collision threshold may be determined depending on frequency, probability of collisions incurred by the random access of MTC devices or the number of devices that cause the collisions within a predetermined time period (for example, within a certain number of frames), or may also be set in consideration of requirements of the system or application. The collision threshold may be a preset value representing the severity of a collision. Preferably, the value of the collision threshold is variable. For example, the value of the collision threshold may vary with the assignment of the temporary access resource. For example, when the temporary access resource has not been assigned yet, the collision threshold may be a larger value so as to reduce error determination probability for a burst of access; while when the occurrence of a burst of access has been determined and the temporary access resource has been assigned, the collision threshold may be a smaller value so as to effectively reduce collision probability in the original access channel.

Figure 3:
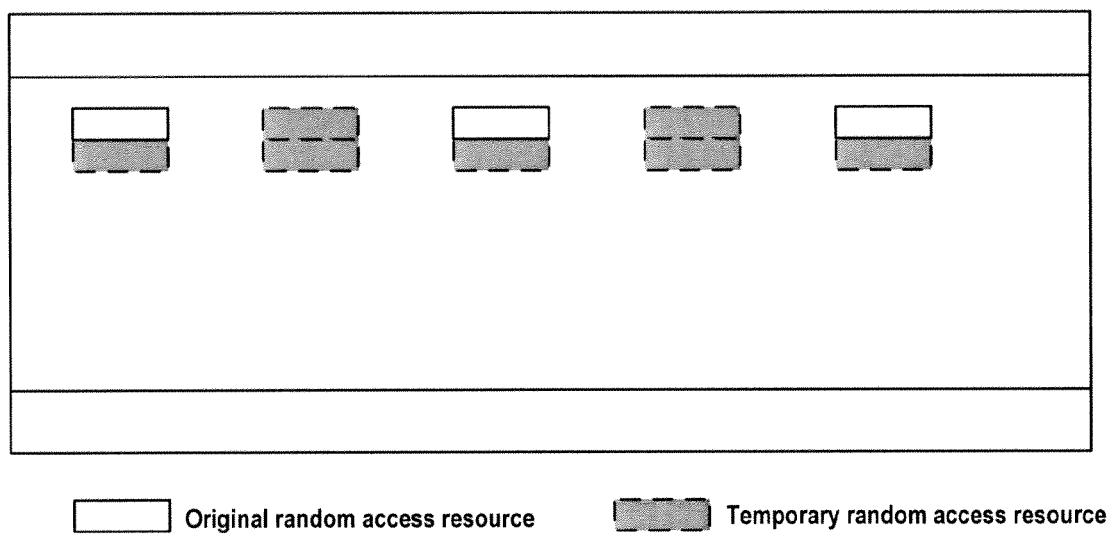
FIG. 3 schematically illustrates assignment of temporary access resources in the present invention.

If the severity of the collision exceeds the collision threshold, it indicates that the access of the MTC device 20 might cause congestion in the uplink channel and has a higher possibility of affecting the access of non-MTC devices, and thus it is required to assign a temporary access resource for the random access of the MTC device 20. Therefore, the eNB 10 assigns the temporary random access resource and includes a temporary random access resource assignment indication in the RAR to be sent subsequently. The temporary random access resource assignment indication may contain indications on the size and location of the random access resource. A plurality of solutions may be adopted for setting the size and location. Preferably, the size of the temporary random access resource may be determined based on the severity of the collision. For example, the size may be an integral multiple of a resource unit of the random access resource in the cell configuration. Preferably, the assigned temporary random access resource is not overlapping the original random access resource of the cell, and its location may be adjacent to the original random access resource in each frame or within a subframe in each frame which originally does not contain the random access resource, as shown in FIG. 3. When the eNB 10 has assigned the temporary random access resource, the temporary random access resource will appear in each following frame until being released. For the MTC device 20 that performs the random access using the temporary random access resource, the eNB 10 will generate a temporary Random Access Radio Network Temporary Identifier (temp-RA-RNTI) corresponding to the temporary random access resource, and include the generated temp-RA-RNTI in the RAR which will be sent subsequently. The temp-RA-RNTI is used in combination with the random access preamble as used upon access to identify the target device of the RAR message. According to an embodiment of the present invention, because there is no overlap between the temporary random access resource and the original random access resource, the Random Access Radio Network Temporary Identifier may be generated with the same method as the RA-RNTI generation method in the existing standards, i.e., the temp-RA-RNTI corresponds to the assigned temporary random access resource. For example, if the current frame includes 10 subframes, the temp-RA-RNTI may be generated according to the following equation:

$$\text{temp-RA-RNTI}=t\_t\_id+10*t\_f\_id+1,$$

wherein, $t\_t\_id$ is the index of the first subframe of the assigned temporary random access resource, $0 \le t\_t\_id<10$, $t\_f\_id$ is the index of the assigned temporary random access resource in the first subframe, and they are arranged in ascending order in the frequency domain.

After receiving the RAR including the temporary access resource assignment indication, the MTC device 20 initiates, at step 209, a new random access attempt using the assigned temporary random access resource based on the indications for the temporary random access resource assignment therein. The random access procedure utilizing the temporary random access resource may be similar to the access procedure of the non-MTC devices using the original random access resource. For example, the MTC device 20 sends a preamble so as to initiate a random access attempt. After the eNB 10 receives the preamble, the eNB 10 sends the RAR to the MTC device 20. The MTC device 20 sends a Layer 2/Layer 3 message to the eNB 10 after receiving the random access response. The eNB 10 sends a contention resolution message to the MTC device 20 after receiving the Layer 2/Layer 3 message. The MTC device 20 receives the contention resolution message. If a collision occurs, the MTC device 20 reselects the preamble and sends the reselected preamble with the temporary random access resource to initiate a new random access attempt.

On the other hand, if the severity of the collision is determined to be below the collision threshold, the eNB 10 does not assign the temporary random access resource. Unlike the non-MTC device, the MTC device 20 performs the random access by using the access resource as originally used when sending the preamble at step 201 again.

Similar to the collision detection in the existing standards, after the eNB 10 receives the Layer 2/Layer 3 message sent by the MTC device 20, it will also perform the collision detection. Similar to the above description, when the eNB 10 detects a collision based on the Layer 2/Layer 3 message at this point, the eNB 10 will further detect the severity of the collision; if it is determined that the severity of the collision exceeds the collision threshold, the eNB 10 assigns a temporary random access resource and includes a temporary random access resource assignment indication in the contention resolution message (CRM) that will be sent subsequently. As above mentioned, after receiving the CMR, the MTC device 20 initiates a new random access attempt using the assigned temporary random access resource based on the temporary random access resource assignment indication at step 209.

The access procedure of MTC devices performing network access with the random access approach has been described with reference to FIG. 2. However, the present invention is not limited to the specific flow of the above specific example, and those skilled in the art would appreciate that the basic idea of the present invention may be applied to other network access involving MTC.

Based on the severity of the collision caused by the network access of the MTC device 20 and/or the uplink congestion, the eNB 10 may continue to assign the temporary access resource for a new MTC device network access attempt. For two different preambles or time-frequency resource units that collide, the same or different temporary access resources may be assigned. As mentioned above, once a temporary access resource is assigned, the temporary access resource will appear in each following frame until being released. For example, the eNB 10 may maintain a list of all assigned temporary access resources and assign these resources to new MTC device network access attempts that cause collisions.

Considering the burst characteristic of the MTC, such a considerable number of MTC device network access attempts may only sustain for a period of time. After the burst of the MTC device network access passes, or when the severity of the collision caused by the MTC device drops below a certain level, for example, becomes less than a certain threshold, the eNB 10 may stop transmitting the indication of the temporary access resource in the RAR or CRM, and thereby stop assigning the temporary access resource to a new MTC network access attempt. Besides, when the severity of the collision caused by the MTC device becomes less than the collision threshold and after the MTC device 20 completes the network access using the assigned temporary access resource, the eNB 10 may flexibly release all or a part of the assigned temporary access resources. Therefore, it is possible to dynamically assign and release the access resources dedicated for the MTC devices and avoid waste of the uplink resources. The threshold herein may employ the above collision threshold, and its value varies with the number of the MTC devices initiating the network access attempts and the assignment of the temporary access resources and other factors. For example, after stopping assigning the temporary access resource to a new MTC network access attempt, a timer may be set in the eNB 10 based on the characteristics of a specific MTC device; if the timer expires, it may be determined that all access attempts using the temporary access resources complete their network access procedures. At this point, the eNB 10 may release the temporary access resources so as to save the uplink resources. The eNB 10 may also only release a part of the temporary access resources. When it is determined to release a part of the temporary access resources, the eNB 10 may continue to assign the remaining part of the temporary access resources to new MTC device network access attempts causing a collision.

The network access procedure of the MTC device 20 has been mainly described above considering the collision caused by the MTC device 20. For non-MTC devices, they may use the existing network access procedure to perform network access. As described above, according to an embodiment of the present invention, if the eNB10 detects a collision before step 203, the RAR is still to be sent, wherein an indication of a temporary access resource may be included. If a non-MTC device receives this RAR, it may directly ignore this indication and prepare for the next access attempt. Another solution is that the non-MTC device may also use the temporary access resources to perform subsequent access attempts. Which solution will be selected may depend on capability and preference of the non-MTC device.

According to the preferred embodiments of the present invention, in order to further reduce the impact of the access of the MTC device 20 on the access of the non-MTC devices, a dedicated subset of preambles may be created for the MTC device 20, wherein the subset may include a part of all available preambles of the cell. For example, a subset of preambles dedicated for the MTC device 20 may be constituted by selecting a certain number of preambles (for example, 10) from all available preambles (for example, 64) of the cell based on the non-MTC device load in the cell. For the heavier non-MTC device load, a subset including fewer preambles may be set to reduce the possibility of collision. The subset of preambles may be transferred to the MTC device 20 through system information. For example, the MTC device may know the subset of preambles by listening to the system broadcast information transmitted by the base station. In this way, the MTC device 20 may merely adopt the preamble in that subset to initiate a network access attempt at step 201. Preferably, when the MTC device 20 performs the access attempt using a non-temporary access resource (i.e., the original access resource), the MTC device 20 may select a preamble from the subset of preambles for transmission, so as to reduce possibility of collision. However, when the MTC device 20 performs the access attempt using the temporary access resource, the preamble that may be selected is not limited to the subset of preambles, but can be selected from all available preambles of the cell, because performing the access attempt using the temporary access resource may already reduce the possibility of collision.

The exemplary embodiments of the present invention have been described above. According to the embodiments of the present invention, when the access resource collision caused by the MTC device is severe enough, a temporary access resource dedicated for the MTC device is assigned, and when the severity of the collision drops to a certain level, the assigned temporary access resource is released, thereby being able to dynamically perform the assignment and release of MTC access resources based on the actual access resource collision, which avoids waste of the uplink resources in a semi-static configuration, and when the MTC device causes congestion in the access channel, a new access resource may be quickly assigned. Besides, setting a dedicated subset of preambles for the MTC device limits the preambles available to the MTC device, which further reduces the possibility of collision and protects the normal access of non-MTC devices. Meanwhile, good backward compatibility is provided by simply making minor modifications to the existing access procedure, for example slightly modifying the RAR and CRM messages, and for a non-MTC device, it is not required to change its network access procedure either.

In the above description, a plurality of embodiments is enumerated for respective steps. Although the inventors try their best to label instances associated with each other, it does not mean that these instances must have a correspondence relationship according to corresponding reference numbers. As long as no contradiction exists between the conditions given by the selected instances, corresponding technical solutions may be constituted by selecting instances without corresponding numbers in different steps, and such technical solutions should be regarded as being included in the scope of the present invention.

Those skilled in the art should readily recognize that different steps of the above method may be implemented through a programmed computer. Here, some embodiments likewise include a machine-readable or computer-readable program storage device (for example, a digital data storage medium) and encoding machine-executable or computer-executable program instructions, wherein the instructions perform some or all steps of the above method. For example, the program storage device may be a digital memory, a magnetic storage medium (for example, magnetic disk or tape), hardware or an optically readable digital data storage medium. The embodiments likewise include the programmed computer performing the steps of the above method.

It should be noted that the above description merely illustrates the technical solution of the present invention by way of an example, but it does not mean that the present invention is limited to the above steps and unit structure. In possible scenarios, the steps and unit structure may be adjusted, selected or abandoned as required. Thus, some steps and units are not necessary elements for implementing the general inventive concept of the present invention. Thus, the technical features necessary for the present invention are merely limited to the minimum requirements for implementing the general inventive concept of the present invention, but not limited by the above specific instances.

By far, the present invention has been described in combination with the preferred embodiments. It should be understood that those skilled in the art may make various other changes, substitutions, and additions without departing from the spirit and scope of the present invention. Thus, the scope of the present invention is not limited to the above particular embodiments, but should be limited by the appended claims.

What is claimed is:

1. A network access method for Machine Type Communications MTC, comprising the following steps:
   a. sending a preamble by an MTC device in a cell to a base station of the cell so as to attempt to perform network access;
   b. receiving an access response from the base station at the MTC device after receiving the preamble;
   c. after receiving the access response, if the access response does not contain a temporary access resource assignment indication, sending a Layer 2/Layer 3 message by the MTC device to the base station; and if the access response contains the temporary access resource assignment indication, returning to step a and resending the preamble by the MTC device using an assigned temporary access resource based on the indication so as to re-attempt to perform the network access;
   d. receiving a contention resolution message from the base station to at the MTC device; and
   e. after receiving the contention resolution message, if the contention resolution message contains a self-identification contained in the Layer 2/Layer 3 message sent by the MTC device at step c, completing the network access by the MTC device; and if the contention resolution message contains the temporary access resource assignment indication, returning to step a and sending the preamble by the MTC device using the assigned temporary access resource based on the indication so as to re-attempt to perform the network access; otherwise, returning to step a and sending the preamble by the MTC device using an originally used access resource again so as to re-attempt to perform the network access.

2. The method according to claim 1, further comprising, between at least one of step a and step b, and step d and step e:
   f. performing collision detection by the base station based on the preamble/Layer 2/Layer 3 message;
   g. if a collision is detected in step f, determining severity of the collision by the base station; and
   h. if it is determined in step g that the severity of the collision exceeds a first collision threshold, assigning a temporary access resource and including the temporary access resource assignment indication in the sent access response/contention resolution message by the base station.

3. The method according to claim 2, further comprising the following step:
   i. after the temporary access resource is assigned, if the severity of the collision drops below a second collision threshold, stopping the assignment of the temporary access resource by the base station.

4. The method according to claim 3, wherein in step i, after the MTC device completes the network access using the temporary access resource, further releasing the assigned temporary access resource or a part thereof by the base station.

5. The method according to claim 1, wherein the base station maintains a list of assigned temporary access resources so as to assign them to new MTC devices attempting to perform the network access.

6. The method according to claim 1, wherein the assigned temporary access resource is not overlapping an original random access resource of the cell.

7. The method according to claim 2, wherein the severity of the collision and the first and second collision thresholds are determined depending on probability of collisions incurred by the network access of the MTC device within a predetermined time period or a number of devices in the cell.

8. The method according to claim 1, wherein in step a,
if the MTC device initiates a network access attempt using an original access resource, the preamble sent by the MTC device is selected from a subset of preambles, the subset of preambles comprising a part of all available preambles of the cell; and
if the MTC device initiates the network access attempt using a temporary access resource, the preamble sent by the MTC device is selected from all available preambles of the cell.

9. The method according to claim 8, wherein the subset of preambles is indicated to the MTC device through a system message of the cell.

10. The method according to claim 8, wherein the size of the subset of preambles is set according to non-MTC device access load in the cell.

11. The method according to claim 2, wherein when assigning the temporary access resource, the base station determines the size of the temporary access resource based on the severity of the collision.

12. The method according to claim 2, wherein when the base station assigns the temporary access resource at step h, it further generates a temporary access radio network temporary identifier (temp-RA-RNTI) corresponding to the assigned temporary access resource, and includes the generated temp-RA-RNTI in the access response/contention resolution message to be sent.

13. A network access system for Machine Type Communications, comprising:
one or more MTC devices in a cell;
a base station of the cell;
wherein the MTC device is adapted to:
send a preamble to the base station so as to attempt to perform network access;
after receiving an access response from the base station, if the access response does not contain a temporary access resource assignment indication, send a Layer 2/Layer 3 message to the base station, and if the access response contains the temporary access resource assignment indication, resend the preamble using an assigned temporary access resource based on the indication so as to re-attempt to perform the network access; and
after receiving a contention resolution message from the base station, if the contention resolution message contains a self-identification contained in the Layer 2/Layer 3 message sent by the MTC device, complete the network access; and if the contention resolution message contains the temporary access resource assignment indication, the MTC device sends the preamble using the assigned temporary access resource based on the indication so as to re-attempt to perform the network access; otherwise, the MTC device sends the preamble using an originally used access resource again so as to re-attempt to perform the network access,
wherein the base station is adapted to:
send the access response to the MTC device after receiving the preamble from the MTC device; and
send the contention resolution message to the MTC device after receiving the Layer 2/Layer 3 message from the MTC device.

14. The system according to claim 13, wherein the base station is further adapted to:
perform collision detection based on the preamble/Layer 2/Layer 3 message from the MTC device;
determine severity of a collision if the collision is detected; and
if it is determined that the severity of the collision exceeds a first collision threshold, assign a temporary access resource, and include the temporary access resource assignment indication in the sent access response/contention resolution message.

* * * * *